Aug. 14, 1923.
J. B. REBER
1,465,235
FIBER OPENING MACHINE
Filed July 29, 1920   2 Sheets-Sheet 1
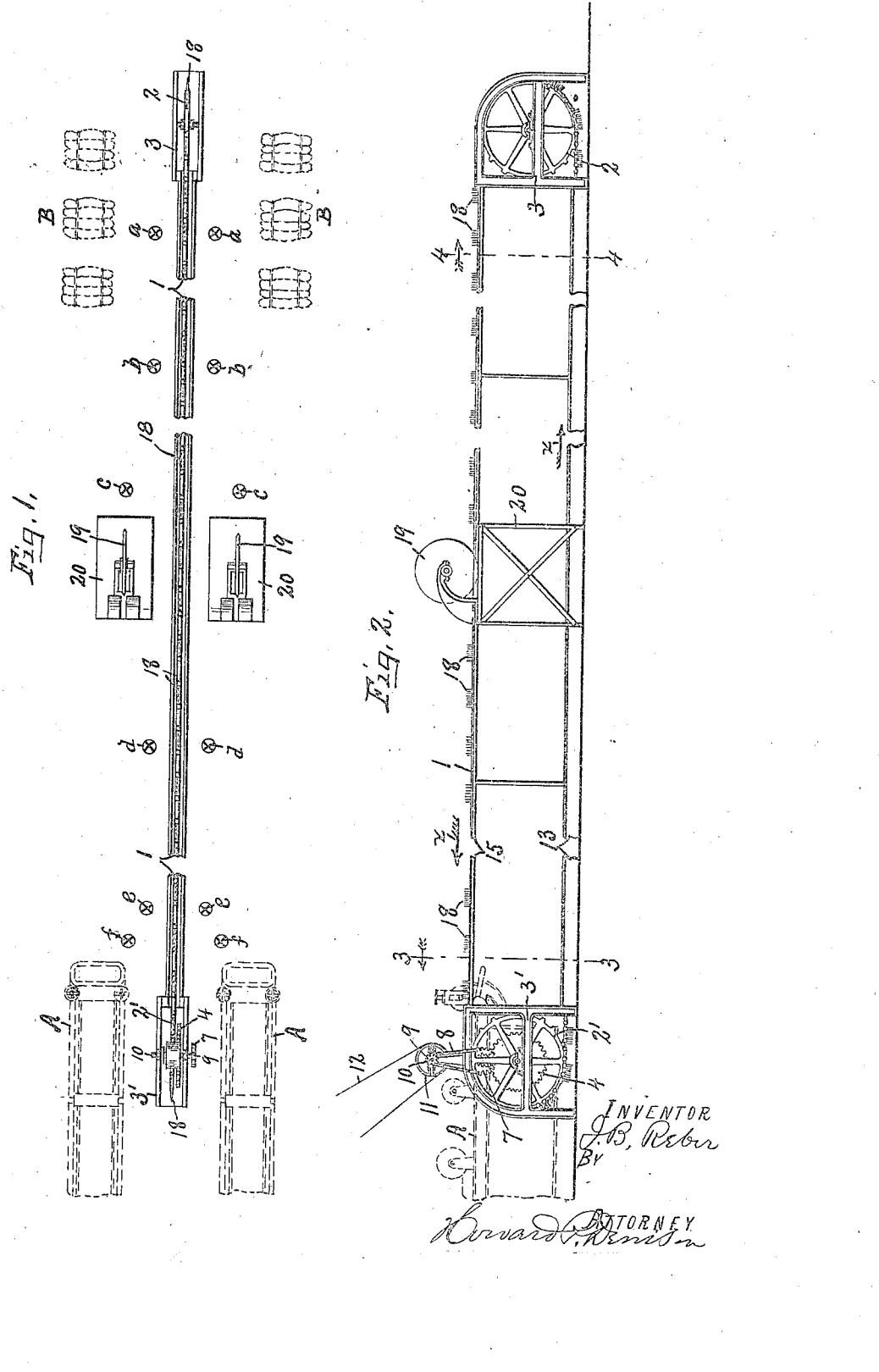

Aug. 14, 1923.
J. B. REBER
1,465,235
FIBER OPENING MACHINE
Filed July 29, 1920
2 Sheets-Sheet 2
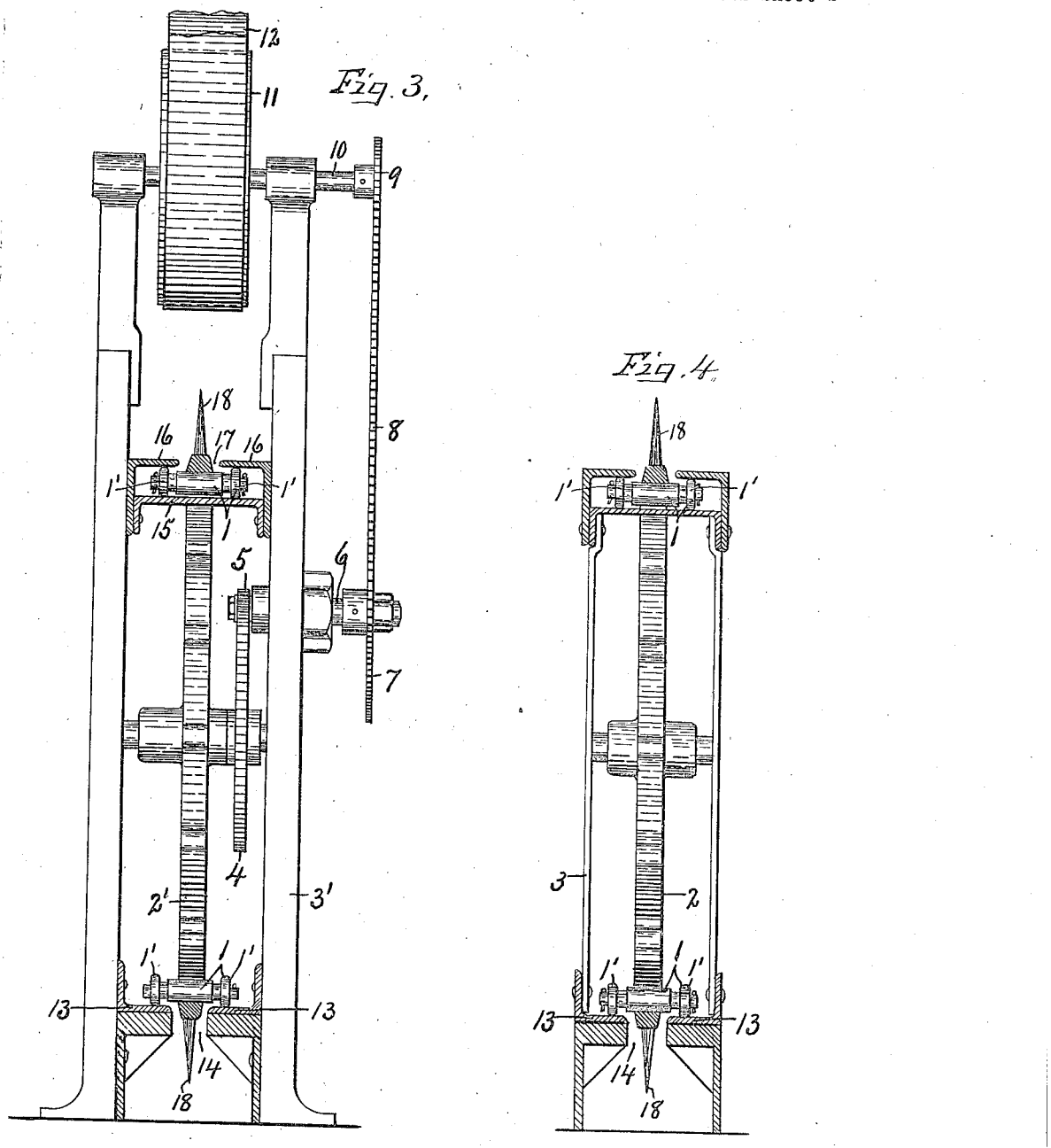

Patented Aug. 14, 1923.

1,465,235

UNITED STATES PATENT OFFICE.

JAMES B. REBER, OF AUBURN, NEW YORK, ASSIGNOR TO COLUMBIAN ROPE COMPANY, OF AUBURN, NEW YORK, A CORPORATION OF NEW YORK.

FIBER-OPENING MACHINE.

Application filed July 29, 1920. Serial No. 399,682.

*To all whom it may concern:*

Be it known that I, JAMES B. REBER, of Auburn, in the county of Cayuga, in the State of New York, have invented new and useful Improvements in Fiber-Opening Machines, of which the following, taken in connection with the accompanying drawings, is a full, clear, and exact description.

This invention relates to the manufacture of rope and more particularly to a method of and apparatus for preparing the hemp, jute or sisal fiber for entrance into the first combing machines, commonly known as breakers where the fiber hanks are first straightened out by combing, the main object being to provide a more convenient, expeditious and economical method of handling the fiber from a more or less distant pile of bales through the various stages of preparation for the breakers.

In other words, I have sought to provide a continuous method or system whereby the several operations of opening, knot-cutting, fiber-cutting and hank straightening and splitting may be successively performed while in transit from the more or less distant pile of bales to the breakers or first combing machines.

One of the specific objects is to provide an endless conveyor for transferring the fiber from the distant stations to the breakers at such rate of speed as to enable the operators stationed along the conveyor to perform with the assistance of the continuous feed movement of the fiber different operations upon the fiber while in transit and without interruption in the continuity of its conveyance.

Another object is to install a suitable cutting machine such as a saw at an intermediate station between the supply station and breakers and in proximity to the conveyor where the excessively long hanks may be cut in sections while in transit without removing other than the severed sections from the conveyor, thus permitting the severed sections to be immediately placed upon the conveyor for continued movement to the breakers.

Another object is to reduce to a minimum the losses incidental to excessive handling and, at the same time, to reduce the labor and time required for supplying the necessary quantity of fiber to the breakers without interruption in the operation of the latter machines.

Other objects and uses relating to specific parts of the device will be brought out in the following description:

In the drawings:

Figure 1 is a top plan, partly broken away, of an apparatus for carrying out the objects of my invention, showing also by dotted lines portions of two of the machines commonly known as breakers, together with the several stations at which the operators are placed for performing their individual work upon the fiber while the latter is carried along by the conveyor from the supply station to the breakers.

Figure 2 is a side elevation of the apparatus shown in Figure 1.

Figure 3 is an enlarged transverse vertical sectional view taken on line 3—3, Figure 2, looking toward the delivery end of the apparatus.

Figure 4 is a transverse vertical sectional view through the same apparatus looking in the opposite direction.

In order that my invention may be clearly understood, I have shown by dotted lines in Figure 1 portions of two first combing machines commonly known as breakers —A—, which are arranged side by side in parallel spaced relation for receiving between them one end of an endless conveyor belt —1—, the opposite end of which extends to a distant station or stations —B— where the bales of fiber are temporarily stored.

Each of these bales contains a considerable number of fiber hanks firmly bound together by suitable ties and each hank of fiber is knotted or tied for convenience in handling when the bale is opened, and, it, therefore, follows that it is necessary to first cut the bale ties to release the hanks after which the knots or ties of the hanks must be cut to release the fiber. These individual fiber hanks are then cut into sections and the fiber of the individual sections is then straightened and split preparatory to feeding them into the breakers.

Heretofore, so far as I am aware, it has been necessary to restack or to repile the hanks or sections thereof into receptacles provided therefor after each operation for conveyance from one operator to another, resulting not only in considerable loss of time and the employment of a considerable force of operators, but also in more or less breakage, twisting, or knotting of the fiber by reason of the loading and reloading of the same into and out of the receptacles, all of which adds considerable to the cost of production of the rope, and the main object of my invention is to avoid this repetition of boxing and handling by causing a continuous mechanical transportation of the hanks from their first release from the bales to the breakers and assisting the performance of the several operations upon the hanks by the movement of the same while in transit from the bale receiving station to said breakers. For this purpose, the endless conveyor belt —1— is mounted upon suitable supporting drums —2— and —2'—, which, in turn, are revolubly mounted in upright end frames —3— and —3'— at the bale receiving station and between the front ends of the breaker machines —A—, respectively, so as to revolve about horizontal parallel axes, whereby, the upper side of the conveyor belt —1— may be caused to move from the receiving station to the breakers, or in the direction indicated by arrow "X," Fig. 2.

Any suitable means may be provided for rotating the drums with the conveyor thereon, and for this purpose, the drums are preferably made in the form of sprocket wheels, while the conveyor is made in the form of a sprocket chain whereby positive motion is transmitted from the drums to the conveyor.

The driving mechanism is preferably applied to the rear drum —2'— so as to keep the upper side of the conveyor reasonably tight, and for this purpose, the shaft of said drum is provided with a relatively large gear —4— meshing with a pinion —5— on the inner end of a countershaft —6— which is journaled in a suitable bearing in one side of the rear frame —3'—.

The upper end of the countershaft —6— is provided with a sprocket wheel —7— connected by a chain —8— to a relatively smaller sprocket wheel —9— on one end of the main driving shaft —10—, which is also journaled in suitable bearings on the top of the rear frame —3'— and is provided with a pulley —11— having a belt —12— adapted to be connected to any available source of power not shown.

The lower portions of the end frames —3— and —3'— are connected by a pair of lengthwise tracks —13— which are disposed in substantially the same horizontal plane parallel with each other for receiving and supporting the lower side of the conveyor —1—, but are spaced apart transversely to form an intervening slot or passage way —14— for receiving certain portions of the conveyor presently described, said tracks being disposed in substantially the same horizontal plane as that of the lower side of the sprocket drums —2— and —2'— to cause the lower side of the chain to travel in substantially the same plane.

The upper portions of the frames —3— and —3'— are connected by an upper lengthwise track —15— and a pair of lengthwise guard rails —16—, the track —15— being parallel with the lower track —13— and disposed in a horizontal plane substantially coincident with that of the upper side of the drums —2— and —2'— for supporting the upper side of the endless conveyor —1— in substantially the same plane, the guard rails —16— being disposed directly above the track —15— in spaced relation thereto, and also in transversely spaced relation to form an intervening passage —17— for certain portions of the adjacent side of the conveyor therethrough.

The conveyor —1— preferably consists of a link belt articulated and apertured to correspond to the teeth of the sprocket wheels —2— and —2'—, certain of the links in uniformly spaced relation longitudinally being provided with a series of pointed fingers or spurs —18— projecting outwardly therefrom at substantially right angles thereto and of uniform length for engaging and feeding the fiber hanks and sections thereof from the bale opening station and intermediate points to the breakers as said hanks and sections are placed thereon by hand.

The link belt or conveyor —1— is provided at regular intervals throughout its length with pairs of opposite rollers —1'— adapted to ride along and upon the upper faces of the tracks —13— and —15— and beneath the guard rails —16— which serve to hold the upper side of the belt against upward displacement from the track —15—.

One or more, in this instance two, power driven cutters —19— of the circular disk type are mounted in suitable supporting frames —20— which are installed at opposite sides of and in proximity to the intermediate portion of the conveyor —1— between the bale opening station and breaker machines —A— for severing sections of the hanks as the latter are carried along by the conveyor from the bale receiving station toward the breakers, the severed sections being replaced upon the spurs of said conveyor as they are severed from the hanks for transportation to the breakers.

One of these conveyors preferably serves to supply the fiber for two of the breakers, and for this purpose is installed so as to feed the fiber between the two of them as shown by dotted lines in Figure 1, in which case, I preferably provide two bale opening stations, separate cutters and separate crews at opposite sides of the line of travel of conveyor so that each crew at their respective stations may perform their respective operations upon the fiber bales, hanks and sections thereof in preparing the fiber for their respective breakers without interference with each other, for example, the members of each crew are stationed at points —a—, —b—, —c—, —d—, —e—, and —f— along opposite sides of and in close proximity to the conveyor from the receiving end to the delivery end thereof, the duties of the members at station —a— being to open up the bales to successively place the released hanks upon the spurs —18— of the conveyor which carries them along to station —b— where the operators cut the knots of the hanks while the latter are in transit to station —c—, at which time, the operator slings the hank across the cutter —19— to sever sections thereof, which sections are then replaced upon the spurs of the conveyor to be carried with the remaining portions of the hanks thereon along to the next station —d—, where the hanks and sections thereof are finally straightened and split and are then carried by the conveyor to station —e— where the straightened and split hanks and sections thereof are removed from the conveyor and handed to the feeders at station —f— for feeding into the breakers, the several operations being practically continuous without removal from the conveyor after the hanks are placed thereon at station —a—

The operation of my invention will now be readily understood upon reference to the foregoing description and the accompanying drawing, and and it will be evident that the details of construction of the conveyor and cutter may be materially modified without departing from the spirit of my invention, and, therefore, I do not wish to limit myself to the precise construction shown and described.

It is to be noted, however, that the hanks of fiber having been fed to the conveyor are allowed to trail down from the conveyor, to which latter they are connected at one point only in the length of the fiber and by reason of this feeding and trailing of the fiber with and from the conveyor, the trailing portions may be readily swung away from and toward the conveyor. This way of feeding the hanks of fiber continuously and in succession one after the other with their ends trailing from the feeding means is of importance, inasmuch as it permits the feed movement of the fiber itself to be utilized in performing the various operations at different points in its progressive movement toward the breaking machine. The fact that the fiber is in motion permits the operatives to perform the several operations with very little effort and requires almost no skill, as for example, in cutting the sections of fiber from those hanks which are too long, the end of the hank is simply swung to one side or away from the conveyor and pressed against the cutter, the forward movement of the body of the hank continuing meanwhile and the severed end is then simply caught back on the conveyor and proceeds as a portion of that hank or of the next succeeding hank, or as a separate bunch of fiber moving toward the breakers.

So, too, the operative takes advantage of the movement of the fiber to assist him in opening up the hanks, cutting the knots and finally in splitting the hanks, where splitting is necessary.

For example, a portion of the hank is simply disconnected from the conveyor and held by the operative while the portion of the hank still connected with the conveyor moves out of the way and the separated portion is dropped into engagement with the conveyor. All these operations are thus performed with the assistance of the forward progressive movement of the fiber itself in unison with the conveyor and, while a conveyor technically known as such in the art is the convenient form of feed means and will be specified as such, it will be understood that any means whereby the hanks of fiber may be progressively fed in orderly succession and portions disengaged and re-engaged with the feeding means would be a full equivalent of the conveyor herein specified.

What I claim is:

1. In rope making machinery, the combination with a first combing machine or breaker, of a pair of horizontally disposed rotary drums, one of which is located near the breaker and the other at a distant station, a stationary guide extending between said drums in a horizontal plane substantially coincident with the upper sides thereof, guard rails extending lengthwise of and above the guide in transversely spaced relation, and an endless conveyer supported by the drums and provided with a lengthwise row of spurs projecting between and above the guard rails for feeding fiber hanks from the distant station to the breaker, and power driven means for rotating the drum nearest the breaker and causing the upper side of the conveyor to travel from the distant station toward said breaker.

2. In rope making, the combination of a first combing machine or breaker, of an endless conveyor leading from a distant station to said breaker and provided with spurs for engaging and feeding fiber hanks from said station to the breaker, means for driving the conveyor, and a hank cutting device intermediate the ends of the conveyor and in proximity thereto.

3. The process of preparing hanks of fiber for breaking in the manufacture of rope and cordage, which consists in feeding the hanks in succession to a continuously moving conveyor, trailing said hanks from said conveyor while leaving them free to be swung away from and toward the conveyor and while said hanks are in motion swinging them away from and toward the conveyor, and simultaneously treating the trailing portions of the fiber to remove the knots and order the same ready for the breaker.

4. The process of preparing hanks of fiber for breaking in the manufacture of rope and cordage, which consists in trailing successive hanks from a continuously moving conveyor while leaving the same free to be swung toward and from the conveyor and while said hanks are in motion swinging the trailing portions of the same away from the conveyor, and simultaneously severing the extremities thereof from the portions attached to the conveyor.

5. The process of preparing hanks of fiber for breaking in the manufacture of rope and cordage, which consists in trailing successive hanks from a continuously moving conveyor while leaving the same free to be swung toward and from the conveyor and while said hanks are in motion swinging the trailing portions of the same away from the conveyor, simultaneously severing the extremities thereof from the portions attached to the conveyor, and then attaching the severed portions themselves to the conveyor.

In witness whereof I have hereunto set my hand this 23d day of July 1920.

JAMES B. REBER.

Witnesses:
H. E. CHASE,
HOWARD P. DENISON.